(12) United States Patent
Kashiwagi

(10) Patent No.: US 7,754,836 B2
(45) Date of Patent: Jul. 13, 2010

(54) WATER AND OIL REPELLENT COMPOSITION AND TREATMENT METHOD

(75) Inventor: Masato Kashiwagi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 948 days.

(21) Appl. No.: 11/512,195

(22) Filed: Aug. 30, 2006

(65) Prior Publication Data

US 2007/0088141 A1 Apr. 19, 2007

Related U.S. Application Data

(60) Provisional application No. 60/712,856, filed on Sep. 1, 2005.

(51) Int. Cl.
  C01F 214/18 (2006.01)
  C08K 3/00 (2006.01)
  D06M 10/00 (2006.01)

(52) U.S. Cl. .................. 526/242; 526/319; 526/249; 524/544; 524/545; 524/546; 524/555; 524/556; 252/8.62

(58) Field of Classification Search ........... 526/242, 526/319, 249; 524/544, 545, 546, 555, 556; 252/8.62
See application file for complete search history.

(56) References Cited

U.S. PATENT DOCUMENTS

| 4,100,340 | A | 7/1978 | Waldmann et al. |
| 5,344,903 | A | 9/1994 | Raiford et al. |
| 2003/0130457 | A1 | 7/2003 | Maekawa et al. |
| 2004/0075074 | A1* | 4/2004 | Kubota et al. ............. 252/8.62 |
| 2005/0267241 | A1 | 12/2005 | Sugimoto et al. |

FOREIGN PATENT DOCUMENTS

| EP | 1 493 761 A1 | 1/2005 |
| EP | 1 632 542 A1 | 3/2006 |
| EP | 1 690 908 A1 | 8/2006 |
| JP | 2006219586 A * | 8/2006 |
| WO | WO 02/064696 A1 | 8/2002 |
| WO | WO 02/083809 A1 | 10/2002 |
| WO | WO 03/062521 A1 | 7/2003 |
| WO | WO 2004/035708 A1 | 4/2004 |
| WO | WO 2004/096939 A1 | 11/2004 |
| WO | WO 2005/047416 A1 | 5/2005 |

OTHER PUBLICATIONS

Maekawa et al.; a Preprint of 16$^{th}$ Fluorochemistry forum, p. 25 (1991), Abstract.
"Preliminary Risk Assessment of the Developmental Toxicity Associated with Exposure to Perfluorooctanoic Acid and its Salts"; U.S. Environmental Protection Agency Office of Pollution Prevention and Toxics Risk Assessment Division; Apr. 10, 2003.
"EPA Intensifies Scientific Investigation of a Chemical Processing Aid"; EPA Environmental News; United States Environmental Protection Agency; Monday, Apr. 14, 2003.
EPA OPPT Fact Sheet; United States Environmental Protection Agency; Apr. 14, 2003.
"Perfluorooctanoic Acid (PFOA), Fluorinated Telomers; Request for Comment, Solicitation of Interested Parties for Enforceable Consent Agreement Development, and Notice of Public Meeting"; United States Environmental Protection Agency; Federal Register; vol. 68, No. 73; Wednesday, Apr. 16, 2003; pp. 18626-18633.

* cited by examiner

*Primary Examiner*—David Wu
*Assistant Examiner*—Michael M Bernshteyn
(74) *Attorney, Agent, or Firm*—Sughrue Mion, PLLC

(57) ABSTRACT

Disclosed is a water- and oil-repellent agent comprising the following fluorine-containing copolymer (A). The fluorine-containing copolymer (A) comprises:

(a1) a fluoroalkyl group-containing polymerizable monomer of the formula:

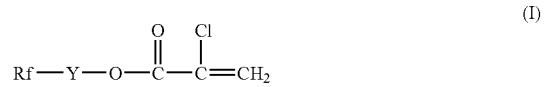

wherein Y is a divalent organic group
[for example, an aliphatic group having 1 to 10 carbon atoms, an aromatic or cycloaliphatic group having 6 to 10 carbon atoms, a —SO$_2$N(R$^1$)R$^2$— group (in which R$^1$ is a hydrogen atom or an alkyl group having 1 to 4 carbon atoms, and R$^2$ is an alkylene group having 1 to 10 carbon atoms), a —CON(R$^1$)R$^2$— group (in which R$^1$ is a hydrogen atom or an alkyl group having 1 to 4 carbon atoms, and R$^2$ is an alkylene group having 1 to 10 carbon atoms), or a —CH$_2$CH(OY$^1$)CH$_2$— group (in which Y$^1$ is a hydrogen atom or an acyl group having 1 to 4 carbon atoms)]; and
Rf is a linear or branched fluoroalkyl or fluoroalkenyl group having 1 to 6 carbon atoms; and
(a2) vinylidene chloride.

10 Claims, 2 Drawing Sheets

WATER AND OIL REPELLENT COMPOSITION AND TREATMENT METHOD

CROSS-REFERENCE TO RELATED APPLICATIONS

This Applicants claims benefit from U.S. Provisional Application No. 60/712,856 filed Sep. 1, 2005.

TECHNICAL FIELD

The present invention relates to a water and oil repellent composition. Particularly, it relates to a water and oil repellent composition having both high water repellency and high hydrostatic pressure resistance under low-temperature curing conditions.

BACKGROUND ARTS

Hitherto, copolymers containing a unit derived from a polyfluoroalkyl group-containing polymerizable monomer are widely used as a water- and oil-repellent agent. In order to obtain the polyfluoroalkyl group-containing copolymer, a polymerization method such as a bulk polymerization, a solution polymerization, a suspension polymerization and an emulsion polymerization can be used. Generally, the solution polymerization and the emulsion polymerization are used. Among them, an aqueous emulsion prepared by the emulsion polymerization is advantageous over a solvent dispersion prepared by the solution polymerization, in view of a work-environmental problem and an effect on environment.

A textile treated with the water- and oil-repellent agent are widely used as, for example, usual clothes, sport clothes, interior goods, out door goods and medical non-woven fabrics. The improvement of properties such as softness, soil resistance and water resistance, and durability of the properties in addition to water- and oil-repellency is increasingly sought according to the spread of use.

Especially, it is desired that a non-woven fabric made of a thermoplastic resin (particularly a polyolefin resin such as polypropylene) exhibits high water repellency and hydrostatic resistance also at low-temperature treatment in view of heat resistance of the fabric.

For example, WO2002/064696, U.S. Pat. No. 5,344,903 and U.S. Pat. No. 4,100,340 disclose that a composition comprising a copolymer obtained from monomers such as a perfluoroalkyl group-containing acrylate and vinylidene chloride is used for the water- and oil-repellent treatment of non-woven fabrics.

Hitherto, a polyfluoroalkyl group contained in the polyfluoroalkyl group-containing polymerizable monomer used in the water and oil repellent composition for these applications is generally a perfluoroalkyl group having at least 8 carbon atoms.

Recent study results (EPA Report "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)) and the like clarify that a PFOA (perfluorooctanoic acid) doubtfully has a potential risk of environmental load. EPA (Environmental Protection Agency of USA) announced on Apr. 14, 2003 that the EPA intensifies the scientific investigation on PFOA. On the other hand, Federal Register (FR Vol. 68, No. 73/Apr. 16, 2003 [FRL-2303-8]) (http://www.epa.gov/opptintr/pfoa/pfoafr.pdf), EPA Environmental News for release Monday April, 2003 "EPA INTENSIFIES SCIENTIFIC INVESTIGATION OF A CHEMICAL PROCESSING AID" (http://www.epa.gov/opptintr/pfoa/pfoaprs.pdf), and EPA OPPT FACT SHEET Apr. 14, 2003 (http://www.epa.gov/opptintr/pfoa/pfoafacts.pdf) announced that a long chain fluoroalkyl group (telomer) may possibly metabolize or decompose to PFOA.

Recently, the use of a polymerizable monomer containing a short-chain Rf group have been studied for the purpose of decreasing the load on environment.

For example, WO03/062521 discloses a water and oil repellent composition comprising a copolymer of a short-chain Rf group-containing (meth)acrylate and vinyl chloride (VCl) or vinylidene chloride (VdCl$_2$) for the purpose of increasing the water resistance. This composition has insufficient water- and oil-repellency and water resistance and insufficient stability to long-term storage and contaminant.

In addition, WO02/083809 and WO04/035708 describe examples using a short-chain Rf group-containing polymerizable monomer, and agents described in these publications suffer from insufficient water- and oil-repellency and water resistance.

EP-1493761A1 describes that the decrease of molecular weight of the short-chain Rf group-containing (meth)acrylate copolymer can improve the performances. This copolymer has insufficient water repellency on particularly cotton fibers and cotton mixture fibers.

A document (Maekawa et al., a Preprint of 16th Fluorochemistry forum, page 25 (1991)) discloses that, in a polymer comprising a repeat unit derived from an Rf group-containing acrylate, a receding contact angle is decreased and water- and oil-repellency is deteriorated, if the chain length of the Rf group is decreased. The studies conducted by the present inventor also reveal that, in a polymer comprising a repeat unit derived from an Rf group-containing acrylate, if the chain length of the Rf group is simply decreased, the water- and oil-repellency is deteriorated and further a water leakage in a heavy rain durability test such as a Bundesmann test is remarkably increased (deterioration of water resistance).

As the methods of overcoming the above-mentioned problems, for example, WO2004/096939A1 discloses that an alpha-substituted acrylate copolymer comprising a short-chain Rf group has good water- and oil-repellency. In addition, WO2005/047416 illustrates examples comprising a copolymer of a short-chain Rf group-containing alpha-substituted acrylate and vinyl chloride and shows that said examples have good water- and oil-repellency.

A water- and oil-repellent agent, however, which is an aqueous dispersion composition comprising the short-chain Rf group-containing copolymer has not always exhibited satisfactory performances in applications requiring the treatment at a low temperature.

That is, the conventional arts do not have a water- and oil-repellent aqueous dispersion which is an alternative compound having chemical structure different from "telomer" and which have both object of decreasing environmental load and high water repellency, hydrostatic pressure resistance and low-temperature curing property.

An object of the present invention is to provide a composition which comprises an alternative compound having chemical structure different from "telomer" and which can impart high water repellency and hydrostatic pressure resistance to a textile substrate under a low-temperature curing conditions.

After intensively studying the causes of problems of conventional arts, the present inventor discovered that the alpha-substituted acrylate copolymer containing the short-chain Rf group has the tendency that the melt viscosity is higher in comparison with an unsubstituted acrylate copolymer, and that the former copolymer has the defects that the former copolymer has poor film formability at the low-temperature cure so that good performances are not easily exhibited.

WO2004/096939 and WO2005/047416 illustrate disclose various compounds which can be used as a comonomer contained in the short-chain Rf group-containing alpha-substituted acrylate copolymers. Conventionally, vinyl chloride (VCl) and vinylidene chloride (VdCl$_2$) have been used in copolymers used in water- and oil repellent agents for the purpose of improving, for example, the adherence to fibers.

Hitherto, however, the study in view of copolymerizability between the short-chain Rf group-containing alpha-substituted acrylate and the comonomer nor the study on relevancy of water- and oil-repellency has not been made.

SUMMARY OF THE INVENTION

The present inventor made various studies and then discovered that, when a specified monomer (that is, vinylidene chloride) is used in a short-chain Rf group-containing alpha-substituted acrylate copolymer, a water and oil repellent composition having particularly high performances can be obtained.

That is, VdCl$_2$ is preferred to VCl as the comonomer used in the short-chain Rf group-containing alpha-substituted acrylate copolymer, and methacrylate is preferred to acrylate because of better copolymerizability to the alpha-substituted acrylate. The use of VdCl$_2$ can give good water- and oil-repellency. Particularly, excellent results are obtained in PP non-woven fabric applications requiring the low-temperature cure.

Although the detailed theory is unclear, the present inventor supposes that good copolymerizability gives small composition distribution to hardly give a copolymer having an extremely high content of the short-chain Rf group-containing alpha-substituted acrylate, which has a high melt viscosity, and a copolymer having an extremely low content of the short-chain Rf group-containing alpha-substituted acrylate, which does not have the expected water- and oil-repellency.

The present inventor completed the present invention for solving the problems of the conventional arts in view of these review results.

The present invention provides a water- and oil-repellent agent comprising the following fluorine-containing copolymer (A):

The fluorine-containing copolymer (A):
a fluorine-containing copolymer which comprises repeating units derived from:
(a1) a fluoroalkyl group-containing polymerizable monomer of the following formula:

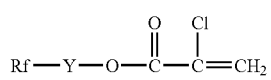
(I)

wherein Y is a divalent organic group
[for example, an aliphatic group having 1 to 10 carbon atoms, an aromatic or cycloaliphatic group having 6 to 10 carbon atoms, a —SO$_2$N(R$^1$)R$^2$— group (in which R$^1$ is a hydrogen atom or an alkyl group having 1 to 4 carbon atoms, and R$^2$ is an alkylene group having 1 to 10 carbon atoms), a —CON(R$^1$)R$^2$— group (in which R$^1$ is a hydrogen atom or an alkyl group having 1 to 4 carbon atoms, and R$^2$ is an alkylene group having 1 to 10 carbon atoms), or a —CH$_2$CH(OY$^1$)CH$_2$— group (in which Y$^1$ is a hydrogen atom or an acyl group having 1 to 4 carbon atoms)]; and Rf is a linear or branched fluoroalkyl or fluoroalkenyl group having 1 to 6 carbon atoms;

(a2) vinylidene chloride;

optionally (a3) (meth)acrylate having a linear or branched alkyl or alkenyl group, or cycloaliphatic alkyl or alkenyl group; and, optionally (a4) a polymerizable monomer containing a crosslinking group or a hydrophilic group, other than the monomers (a1), (a2) and (a3).

In addition, the present invention provides a method of treating non-woven fabric made of a polyolefin resin with using said composition, and a treated article for medical and sanitary applications.

The present invention can provide excellent water- and oil-repellency and high water resistance to a fiber substrate under low-temperature curing conditions, and can have good stability (such as mechanical stability, chemical stability and long-term stability).

DETAILED DESCRIPTION OF THE PREFERRED EMBODIMENTS

Figure 1:
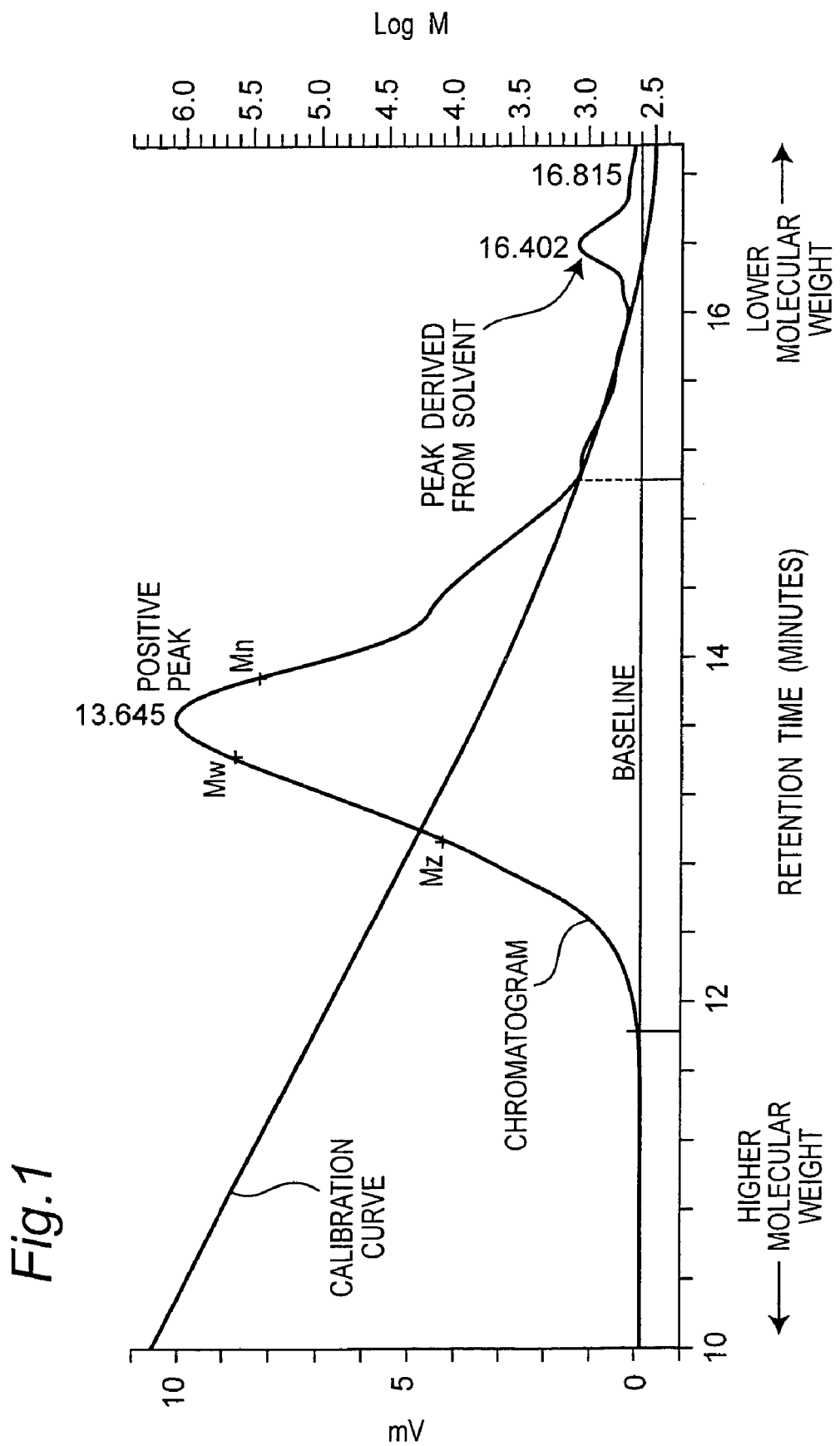
FIG. 1 is a GPC chart of a polymer obtained in Example 1.

In the monomer (a1), the Rf group is preferably a perfluoroalkyl group or a perfluoroalkenyl group. The carbon number of the fluoroalkyl group or fluoroalkenyl group is from 1 to 6, for example, from 1 to 5, particularly from 1 to 4.

Examples of the fluoroalkyl group include —CF$_3$, —CF$_2$CF$_3$, —CF$_2$CF$_2$CF$_3$, —CF(CF$_3$)$_2$, —CF$_2$CF$_2$CF$_2$CF$_3$, —CF$_2$CF(CF$_3$)$_2$, —C(CF$_3$)$_3$, —(CF$_2$)$_4$CF$_3$, —(CF$_2$)$_2$CF(CF$_3$)$_2$, —CF$_2$C(CF$_3$)$_3$, —CF(CF$_3$)CF$_2$CF$_2$CF$_3$, —(CF$_2$)$_5$CF$_3$ and —(CF$_2$)$_3$CF(CF$_3$)$_2$. Examples of the fluoroalkenyl group include —CF=CF(CF$_3$), —CF=C(CF$_3$)$_2$, —C(CF$_3$)=CF(CF(CF$_3$)$_2$) and —C(CF$_2$CF$_3$)=C(CF$_3$)$_2$.

Y includes an aliphatic group having 1 to 10 carbon atoms, an aromatic or cycloaliphatic group having 6 to 10 carbon atoms, a —SO$_2$N(R$^1$)R$^2$— group (in which R$^1$ is a hydrogen atom or an alkyl group having 1 to 4 carbon atoms, and R$^2$ is an alkylene group having 1 to 10 carbon atoms), a —CON(R$^1$)R$^2$— group (in which R$^1$ is a hydrogen atom or an alkyl group having 1 to 4 carbon atoms, and R$^2$ is an alkylene group having 1 to 10 carbon atoms), or a —CH$_2$CH(OY$^1$)CH$_2$— group (in which Y$^1$ is a hydrogen atom or an acyl group having 1 to 4 carbon atoms). The aliphatic group is preferably an alkylene group (particularly having 1 to 4 carbon atoms, for example, 1 or 2 carbon atoms). The aromatic group and cycloaliphatic group may be substituted or may not be substituted.

Examples of the monomer (a1) include fluorine-containing acrylate esters of the formulas:

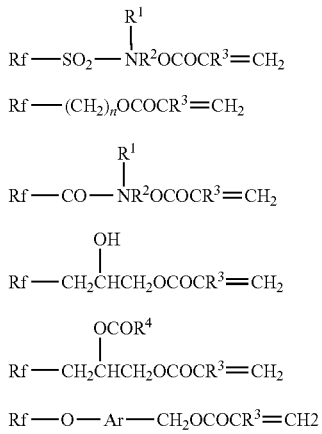

(1) Rf—SO$_2$—NR$^2$OCOCR$^3$=CH$_2$ (2) Rf—(CH$_2$)$_n$OCOCR$^3$=CH$_2$ (3) Rf—CO—NR$^2$OCOCR$^3$=CH$_2$ (with R$^1$ on N)

(4) Rf—CH$_2$CHCH$_2$OCOCR$^3$=CH$_2$ (with OH)

(5) Rf—CH$_2$CHCH$_2$OCOCR$^3$=CH$_2$ (with OCOR$^4$)

(6) Rf—O—Ar—CH$_2$OCOCR$^3$=CH2 wherein Rf is a perfluoroalkyl group or perfluoroalkenyl group having 1 to 6 carbon atoms, R$^1$ is a hydrogen atom or an alkyl group having 1 to 4 carbon atoms, R$^2$ is an alkylene group having 1 to 10 carbon atoms, R$^3$ is a chlorine atom, R$^4$ is an alkyl group having 1 to 3 carbon atoms, Ar is an aryl group optionally having a substituent group, and n is an integer of 1 to 10.

Specific examples of the monomer (a1) include:
CF$_3$(CF$_2$)$_5$CH$_2$OCOCCl=CH$_2$,
CF$_3$(CF$_2$)$_5$(CH$_2$)$_2$OCOCCl=CH$_2$,
(CF$_3$)$_2$CF(CF$_2$)$_2$(CH$_2$)$_2$OCOCCl=CH$_2$,
CF$_3$(CF$_2$)$_3$CH$_2$OCOCCl=CH$_2$,
CF$_3$(CF$_2$)$_3$(CH$_2$)$_2$OCOCCl=CH$_2$,
CF$_3$CF$_2$CH$_2$OCOCCl=CH$_2$,
CF$_3$CF$_2$(CH$_2$)$_2$OCOCCl=CH$_2$,
CF$_3$(CF$_2$)$_3$SO$_2$N(CH$_3$)(CH$_2$)$_2$OCOCCl=CH$_2$,
CF$_3$(CF$_2$)$_3$SO$_2$N(C$_2$H$_5$)(CH$_2$)$_2$OCOCCl=CH$_2$,
(CF$_3$)$_2$CF(CF$_2$)$_2$CH$_2$CH(OCOCH$_3$)CH$_2$OCOCCl=CH$_2$, and
(CF$_3$)$_2$CF(CF$_2$)$_2$CH$_2$CH(OH)CH$_2$OCOCCl=CH$_2$.

The amount of the monomer (a1) may be from 40 to 95% by weight, preferably from 50 to 90% by weight, particularly from 55 to 85% by weight, based on the copolymer.

The monomer (a2) is vinylidene chloride. The amount of the monomer (a2) may be from 3 to 55% by weight, preferably from 5 to 50% by weight, particularly from 10 to 45% by weight, based on the copolymer.

The monomer (a3) may be a (meth)acrylate containing a linear or branched alkyl or alkenyl group, or a cyclo-alkyl or alkenyl group. Generally the monomer (a3) is a compound free from fluorine and chlorine. The carbon number of alkyl or alkenyl group is not limited, but the lower limit of the carbon number is preferably 16 and the upper limit of the carbon number is preferably 30.

The monomer (a3) may be a (meth)acrylate of the general formula:

CH$_2$=CA$^1$COOA$^2$ wherein A$^1$ is a hydrogen atom or methyl group, and A$^2$ is a linear or branched alkyl or alkenyl group, or a cycloaliphatic alkyl or alkenyl group (having 1 to 30 carbon atoms).

Specific examples of the monomer (a3) include behenyl (meth)acrylate, stearyl(meth)acrylate, isostearyl(meth)acrylate, oleyl(meth)acrylate, cetyl(meth)acrylate, tetradecyl (meth)acrylate, lauryl(meth)acrylate, 2-ethylhexyl(meth) acrylate, n-butyl(meth)acrylate, isobutyl(meth)acrylate, ethyl(meth)acrylate, methyl(meth)acrylate, cyclohexyl (meth)acrylate, isobornyl(meth)acrylate, dicyclopentanyl (meth)acrylate, dicyclopentenyl(meth)acrylate, and dicyclopentenyloxyethyl(meth)acrylate.

In the monomer (a3) (and other monomers), the (meth) acrylate is preferably methacrylate.

The amount of the monomer (a3) may be from 0 to 50% by weight, preferably from 1 to 40% by weight, particularly from 3 to 35% by weight, based on the copolymer.

The monomer (a4) is a monomer containing a crosslinkable group or a hydrophilic group. Examples of the crosslinkable group or the hydrophilic group include a hydroxyl group, an epoxy group, a chloromethyl group, a blocked isocyanate group, an amino group, a carboxyl group, a polyoxyalkylene group, and an ethylenically unsaturated group. The monomer (a4) is a monomer which is other than monomers (a1) to (a3).

The monomer (a4) is preferably a monomer free from fluorine. The monomer (a4) may be a compound having at least two crosslinkable or hydrophilic groups. Alternatively, the monomer (a4) may be a compound having at least one carbon-carbon double bond and at least one crosslinkable or hydrophilic group.

Specific examples of the monomer (a4) include diacetoneacrylamide, (meth)acrylamide, N-methylolacrylamide, 2-hydroxypropyl(meth)acrylate, 2-hydroxyethyl(meth)acrylate, 3-chloro-2-hydroxypropyl(meth)acrylate, N,N-dimethylaminoethyl(meth) acrylate, N,N-diethylamino-ethyl(meth) acrylate, polyethyleneglycol mono(meth)acrylate, polyethyleneglycol di(meth)acrylate, butadiene, chloroprene, glycidyl (meth)acrylate and blocked isocyanate group-containing (meth)acrylate, to which the monomer (a4) is not limited.

The amount of the monomer (a4) may be from 0 to 20% by weight, preferably from 0.1 to 15% by weight, particularly from 0.3 to 10% by weight, based on the copolymer.

The copolymer (A) may contain a polymerizable monomer, which is polymerizable with the monomer (a1), such as vinyl chloride, acrylonitrile, styrene, benzyl(meth)acrylate, (meth)acrylate having polysiloxane, maleimides having N-substitution, alkyl fumarate or maleate esters, vinyl esters of fatty acid, vinyl ethers, vinyl alkyl ketones, and alpha-olefins, in addition to the monomers (a1), (a2), (a3) and (a4). Said polymerizable monomer may be in the amount of at most 20% by weight, for example, from 0.1 to 10% by weight, based on the copolymer.

The molecular weight of the fluorine-containing polymer may be generally from 1,000 to 1,000,000, particularly from 3,000 to 200,000. The molecular weight of the polymer can be measured by, for example, GPC.

The copolymer of the present invention may be a random copolymer or a block copolymer.

A polymerization method of obtaining the copolymer of the present invention is not specifically limited, and various polymerization methods such as a bulk polymerization, a solution polymerization, an emulsion polymerization and a radiation polymerization may be selected. Generally, the solution polymerization using an organic solvent and the emulsion polymerization using water alone or both of an organic solvent and water are selected. After the polymerization, water may be added for dilution or an emulsifying agent may be added for emulsification in water to give a treatment liquid.

Examples of the organic solvent include ketones such as acetone, methyl ethyl ketone and methyl isobutyl ketone; esters such as butyl acetate, ethyl acetate and methyl acetate; glycols such as propylene glycol, dipropylene glycol monomethyl ether, dipropylene glycol, tripropylene glycol and low-molecular weight polyethylene glycol; and alcohols such as ethyl alcohol and isopropanol.

Examples of the emulsifier used for the emulsion polymerization and for addition after the polymerization include various emulsifiers such as conventional anionic, cationic and nonionic emulsifiers.

For example, peroxides, azo compounds or persulfate compounds can be used as a polymerization initiator. The polymerization initiator is generally water-soluble and/or oil-soluble.

Specific examples of the oil-soluble polymerization initiator preferably include 2,2'-azobis(2-methylpropionitrile), 2,2'-azobis(2-methylbutyronitile), 2,2'-azobis(2,4-dimethylvaleronitrile), 2,2'-azobis(2,4-dimethyl-4-methoxyvaleronitrile), 1,1'-azobis(cyclohexane-1-carbonitrile), dimethyl-2,2'-azobis(2-methylpropionate), 2,2'-azobis(2-methylbutyronitile), benzoylperoxide, di-tert-butylperoxide, lauroylperoxide, cumene hydroperoxide, t-butyl peroxypivalate, t-butyl peroxyneodecanate, and diisopropylperoxydicarbonate.

Specific examples of the water-soluble polymerization initiator preferably include 2,2'-azobis(2-methyl propionamidine)hydrochloride, 2,2'-azobis[2-(2-imidazolin-2-yl)propane]hydrochloride, 2,2'-azobis[2-(2-imidazolin-2-yl)propane]sulfate salt hydrate, 2,2'-azobis[2-(5-methyl-2-imidazolin-2-yl)propane]hydrochloride, potassium persulfate, barium persulfate, ammonium persulfate and hydrogen peroxide.

The polymerization initiator is used in the amount in the rage from 0.01 parts by weight to 5 parts by weight, based on 100 parts by weight of the monomers.

A chain transfer agent may be used for the purpose of controlling the molecular weight. Known mercapto group-containing compounds may be used as the chain transfer agent. Specific examples thereof include 2-mercaptoethanol, thiopropionic acid and alkyl mercaptan. The mercapto group-containing compound is used in the amount of at most 10 parts by weight, for example, from 0.01 to 7 parts by weight, based on 100 parts by weight of the monomers.

The copolymer can be prepared specifically as follows:

In a solution polymerization, there can be used a method of dissolving the monomer(s) into an organic solvent in the presence of a polymerization initiator, replacing the atmosphere by nitrogen, and stirring the mixture with heating, for example, at the temperature within the range from 50° C. to 120° C. for 1 hour to 10 hours. The polymerization initiator may be generally an oil-soluble polymerization initiator. The organic solvent is inert to the monomer(s) and dissolves the monomer(s), and examples thereof include pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 50 to 1,000 parts by weight, based on 100 parts by weight of total of the monomers.

In an emulsion polymerization, there can be used a method of emulsifying monomers in water in the presence of a polymerization initiator and an emulsifying agent, replacing the atmosphere by nitrogen, and copolymerizing with stirring, for example, at the temperature within the range from 50° C. to 80° C. for 1 hour to 10 hours. The polymerization initiator may be a water-soluble initiator and/or an oil-soluble initiator.

In order to obtain a polymeric dispersion in water, which is superior in storage stability, it is desirable that the monomers are dispersed in water by using an emulsifying device capable of applying a strong shearing energy (e.g., a high-pressure homogenizer and an ultrasonic homogenizer) and then polymerized with using the water-soluble polymerization initiator. As the emulsifying agent, various emulsifying agents such as a cationic emulsifying agent, an anionic emulsifying agent and a nonionic emulsifying agent can be used in the amount within the range from 0.5 to 20 parts by weight based on 100 parts by weight of the monomers. When the monomers are not completely compatibilized, a compatibilizing agent (e.g., a water-soluble organic solvent and a low-molecular weight monomer) capable of sufficiently compatibilizing them is preferably added to these monomers. By the addition of the compatibilizing agent, the emulsifiability and copolymerizability can be improved.

The emulsifier is preferably a nonionic surfactant alone, or a combination of a nonionic surfactant and an ionic surfactant (for example, a cationic surfactant, an anionic surfactant and/or an amphoteric surfactant). The amount of the ionic surfactant may be from 0.1 to 500 parts by weight, based on 100 parts by weight of the nonionic surfactant.

The nonionic surfactant is preferably a combination of a nonionic surfactant having an HLB value of at most 10 (for example, from 4 to 10) and a nonionic surfactant having an HLB value of at least 15 (for example, from 16 to 19). The weight ratio of the nonionic surfactant having an HLB value of at most 10 to the nonionic surfactant having an HLB value of at least 15 may be from 1:100 to 100:1, for example, from 1:10 to 10:1.

Examples of the nonionic surfactant having an HLB value of at most 10 include:

sorbitan fatty acid esters such as sorbitan monolaurate, sorbitan monomyristate, sorbitan monostearate, sorbitan sesquistearate and sorbitan monooleate;

polyoxyethylene alkyl ethers such as polyoxyethylene (2) stearyl ether, polyoxyethylene(3)isotridecyl ether and polyoxyethylene(2)oleyl ether;

polyoxyethylene glycol fatty acid esters such as polyethylene glycol(4EO) monostearate, polyethylene glycol(4EO) monooleate and polyoxyethylene glycol(8EO) distearate;

a surfactant satisfying an HLB value of at most 10 represented by the formula:

wherein $R^1$ is an alkyl group having 1 to 22 carbon atoms or an alkenyl group having 2 to 22 carbon atoms, $R^2$ is an alkylene group having at least 3 carbon atoms, $R^3$ is a hydrogen atom, an alkyl group having 1 to 22 carbon atoms or an alkenyl group having 2 to 22 carbon atoms, p is the number of at least 2, and q is the number of 0 or at least 1;

a surfactant satisfying an HLB value of at most 10 represented by the formula:

wherein $R^1$ is an alkyl group having 1 to 22 carbon atoms or an alkenyl group having 2 to 22 carbon atoms, $R^2$ is an alkylene group having at least 3 carbon atoms, $R^4$ is H, $R^1$CO— or $R^3$ ($R^3$ is a hydrogen atom, an alkyl group having 1 to 22 carbon atoms or an alkenyl group having 2 to 22 carbon atoms), p is the number of at least 2, and q is the number of 0 or at least 1; and a polyoxyethylene/polyoxypropylene block copolymer-type surfactant satisfying an HLB value of at most 10.

Examples of the nonionic surfactant having an HLB value of at least 15 include:

polyoxyethylene sorbitan fatty acid esters having an HLB value of at least 15 such as polyoxyethylene(20)sorbitan monostearate, polyoxyethylene(20)sorbitan monooleate, polyoxyethylene(20)sorbitan monopalmitate;

polyoxyethylene alkyl ethers such as polyoxyethylene(20) stearyl ether, polyoxyethylene(20)oleyl ether and polyoxyethylene(50)oleyl ether;

polyoxyethylene glycol fatty acid esters such as polyethylene glycol(25EO) monostearate, polyethylene glycol(40EO) monostearate and polyoxyethylene glycol(150EO) distearate;

a surfactant satisfying an HLB value of at least 15 represented by the formula:

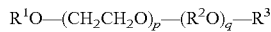

wherein $R^1$ is an alkyl group having 1 to 22 carbon atoms or an alkenyl group having 2 to 22 carbon atoms, $R^2$ is an alkylene group having at least 3 carbon atoms, $R^3$ is a hydrogen atom, an alkyl group having 1 to 22 carbon atoms or an alkenyl group having 2 to 22 carbon atoms, p is the number of at least 2, and q is the number of 0 or at least 1;

a surfactant satisfying an HLB value of at least 15 represented by the formula:

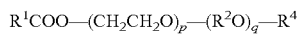

wherein $R^1$ is an alkyl group having 1 to 22 carbon atoms or an alkenyl group having 2 to 22 carbon atoms, $R^2$ is an alkylene group having at least 3 carbon atoms, $R^4$ is H, $R^1$CO— or $R^3$ ($R^3$ is a hydrogen atom, an alkyl group having 1 to 22 carbon atoms or an alkenyl group having 2 to 22 carbon atoms), p is the number of at least 2, and q is the number of 0 or at least 1; and polyoxyethylene/polyoxypropylene block copolymer-type surfactant satisfying an HLB value of at least 15.

If necessary, a nonionic surfactant having an HLB value between 10 and 15 may be used together.

Examples of the water-soluble organic solvent include acetone, methyl ethyl ketone, propylene glycol, dipropylene glycol monomethyl ether, dipropylene glycol, tripropylene glycol and ethanol. The water-soluble organic solvent may be used in the amount within the range from 0.1 to 80 parts by weight, e.g., from 1 to 50 parts by weight, based on 100 parts by weight of water.

The thus obtained copolymer is optionally diluted with or dispersed in water, an organic solvent and the like, and then can be prepared in the form of arbitrary form such as an emulsion, a solution in an organic solvent or an aerosol to give a water- and oil-repellent composition. The copolymer acts as an active component of the water- and oil-repellent composition. The water- and oil-repellent composition comprises the fluorine-containing copolymer and a medium (particularly a liquid medium such as aqueous medium) (for example, an organic solvent and/or water) The water- and oil-repellent composition of the present invention preferably comprises the fluorine-containing copolymer, the surfactant and the aqueous medium. In the present invention, the "aqueous medium" means a medium consisting of water, and a medium containing an organic solvent in addition to water (The amount of the organic solvent is at most 80 parts by weight, for example, from 1 to 50 parts by weight, based on 100 parts by weight of water). The concentration of the fluorine-containing copolymer in the water- and oil-repellent composition may be, for example, from 0.1 to 50% by weight.

The copolymer of the present invention can be applied as the water- and oil-repellent agent to an article by an arbitrary method according to types of the article to be treated and the above-mentioned preparation form (such as the emulsion, the solution and the aerosol). For example, when the water- and oil-repellent agent is the aqueous emulsion or the solution in organic solvent, the fluorine-containing copolymer is adhered to surfaces of an article to be treated, by a well-known coating procedure such as an immersion coating and a spray coating, and is dried. If necessary, a thermal treatment such as the curing may be conducted.

If necessary, another blender may be used together. For example, included are a water- and oil-repellent agents, crease-proofing agents, anti-shrink agents, flame retardants, crosslinking agents, antistatic agents, wetting agents, softeners, water-soluble polymers such as polyethylene glycol and polyvinyl alcohol, wax emulsions, antimicrobial agents, pigments and paints. These blenders may be added to the treatment bath at the time of treating the substrate, or, if possible, may be previously mixed with the copolymer of the present invention before the application.

The article to be treated is not particularly limited and include a textile, masonry, a filter (for example, an electrostatic filter), a dust protective mask, glass, paper, wood, leather, fur, asbestos, brick, cement, metal and oxide, ceramics, plastics, a coated surface and a plaster. The textile is particularly useful. The textile has various examples. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semi-synthetic fibers such as rayon and acetate; inorganic fibers such as glass fiber, carbon fiber and asbestos fiber; and a mixture of these fibers. The textile may be in any form such as a fiber, a yarn and a fabric. The textile is preferably a nonwoven fabric made of polyolefin (particularly polypropylene) resin.

In the present invention, the article to be treated is treated with the water- and oil repellent agent. The "treatment" means that a treatment agent is applied to a substrate by immersion, spraying, coating or the like. The treatment gives the result that a fluorine-containing copolymer, which is an active component of the treatment agent, is penetrated into the internal parts of the substrate and/or adhered to the surfaces of the substrate.

After the textile is treated with treatment agent, it is preferable to dry the textile at the temperature of at most 140° C., particularly 60 to 130° C. The thermal treatment is conducted by the drying.

EXAMPLES

Examples are shown hereinafter to illustrate the present invention. In Examples, "%" and "parts" means "% by weight" and "parts by weight", respectively, unless otherwise specified.

Properties evaluated in Examples are determined as follows:

IPA/Water Repellency

A polymeric dispersion liquid having a solid content of 30% is diluted with water and other components are added so that the solid content of the polymeric dispersion liquid is 0.7%, an antistatic agent (alkyl phosphate ester, an aqueous solution having a solid content of 25%) is 0.76% and a wetting agent (n-hexanol) is 0.6%, whereby preparing a treatment liquid. A propylene non-woven cloth (an SMS (spunbond/meltblown/spunbond) structure, a density of 48 g/m$^2$) is immersed in the treatment liquid, squeezed with a mangle to give a wet pickup of 140%, and dried at 110° C. for two minutes to give a test cloth for evaluation of IPA/water repellency.

The IPA/water repellency (water repellency) is determined by dropping several drops of an IPA (isopropanol)/water mixture test solution shown in the following Table 1 according to an oil repellency test method of AATCC-TM118 on two positions of a surface of the test cloth and observing the penetration state of the drops after 30 seconds. The maximum point at which the test solution exhibits no penetration is expressed by the IPA/water repellency. A symbol (–) is added after the numeral value in the case that a contact angle is somewhat small (IPA/water repellency is slightly poor) although no penetration is exhibited.

TABLE 1

| Repellency to IPA/water | Test solution | Mixing ratio (Volume ratio %) |
|---|---|---|
| 10 | IPA | 100 |
| 9 | IPA/water | 90/10 |
| 8 | IPA/water | 80/20 |
| 7 | IPA/water | 70/30 |
| 6 | IPA/water | 60/40 |
| 5 | IPA/water | 50/50 |
| 4 | IPA/water | 40/60 |
| 3 | IPA/water | 30/70 |
| 2 | IPA/water | 20/80 |
| 1 | IPA/water | 10/90 |
| W | Water | 100 |
| 0 | Inferior to W | — |

Hydrostatic Pressure Resistance Test

A propylene non-woven cloth (an SMS structure, a density of 48 g/m$^2$) is prepared in the same manner as in the IPA/water repellency. A hydrostatic pressure is applied to the test cloth by using a water resistance measuring apparatus (Model PHL-5000, manufactured by Daiekagaku Seiki manufacturing Co., Ltd.), and a hydrostatic pressure resistance until the formation of droplets penetrating at three positions is measured. A larger hydrostatic pressure resistance is preferable.

Elemental Analysis of Polymer

Methanol (20 g) is added to a polymeric dispersion prepared in Preparative Example 1 (Solid content: 30%) (10 g), which is stirred and centrifuged to precipitate a polymer. Supernatant is removed off and methanol (20 g) is added to the polymer, which is stirred and centrifuged to precipitate a polymer. Precipitated polymer is dried and grounded, then subjected to an elemental analysis.

In the elemental analysis, according to a combustion flask method, the polymer is combusted, a combustion gas is absorbed into water, and the amounts of fluorine and chlorine are measured by subjecting the resultant liquid to a fluorine ion electrode method and an ion chromatography method.

Reaction Ratio of Vinylidene Chloride and Vinyl Chloride

A weight ratio of vinylidene chloride or vinyl chloride in a polymer is calculated from elemental analysis values of fluorine and chloride of the polymer. A reaction ratio is determined in view of a weight ratio of vinylidene chloride or vinyl chloride in a charged monomer.

Reaction ratio=(Weight ratio of vinylidene chloride or vinyl chloride in polymer)/(Weight ratio of vinylidene chloride or vinyl chloride in charged monomer)

Gel Permeation Chromatography (GPC) Measurement

A polymer is obtained from a polymeric dispersion in the same manner as in the elemental analysis. The polymer is converted into the form of a 5% solution of the polymer in tetrahydrofuran (THF), which is then subjected to a GPC measurement under the following conditions.

A molecular weight (in terms of polystyrene) of a peak top, the presence or absence of a negative peak, and a molecular weight (in terms of polystyrene) of the negative peak top in the resultant chart are evaluated.

Apparatus: Shodex GPC-104 (manufactured by Showa Denko K.K.)

Detector: RI-74S (manufactured by Showa Denko K.K.)

Column: Shodex LF-604×2 columns+Shodex KF-601×2 columns (manufactured by Showa Denko K.K.)

Solvent: Tetrahydrofuran (THF)

Flow rate: 0.6 ml/min

Temperature: 40° C.

Example 1

$C_4F_9CH_2CH_2OCOC(Cl)=CH_2$ (hereinafter referred to as "9FCA") (75.5 g), stearyl methacrylate (hereinafter referred to as "StMA") (9.5 g), N-methylolacrylamide (hereinafter referred to as "N-MAM") (2.4 g), 3-chloro-2-hydroxypropyl methacrylate (hereinafter referred to as "CHPMA") (0.6 g), polyoxyethylene(3)isotridecyl ether (HLB value of 8) (nonionic surfactant, EAD-8 manufactured by NOF Corp.) (3.2 g), polyoxyethylene(50)oleyl ether (HLB value of 18) (BO-50 manufactured by Nikko Chemicals Co., Ltd.) (1.8 g), polyoxyethylene(20)lauryl ether (HLB value of 16) (K-220 manufactured by NOF Corp.) (7.5 g), tripropylene glycol (hereinafter referred to as "TPG") (33.0 g), ion-exchange water (205 g), lauryl mercaptan (hereinafter referred to as "L-SH") (2.9 g) were charged and heated at 60° C. The mixture was previously dispersed by a homomixer and emulsified for 10 minutes by an ultrasonic emulsifier.

This emulsion was transferred to a 500 ml autoclave (equipped with a stirrer, a thermometer and nitrogen introducing tube). After replaced with nitrogen, vinylidene chloride (hereinafter referred to as "VdCl2") (28.0 g) was charged. A polymerization initiator, azobisamidinopropane dihydrochloride (0.9 g) was added, and the emulsion was heated to 60° C., to initiate the polymerization.

After stirred at 60° C. for 4 hours, unreacted vinylidene chloride was discharged. Disappearance of monomers other than vinylidene chloride was confirmed by a gas chromatography (GC). An aqueous dispersion having a solid content of 33% was obtained. The aqueous dispersion was diluted with ion-exchanged water to give a water and oil repellent composition having a solid content of 30%.

Properties of the obtained composition were evaluated. The results are shown in Table 2. The reaction ratio of vinylidene chloride monomer was 79%. A GPC chart is shown in FIG. 1.

Comparative Example 1

$C_4F_9CH_2CH_2OCOC(Cl)=CH_2$ (hereinafter referred to as "9FCA") (75.5 g), stearyl methacrylate (hereinafter referred to as "StMA") (9.5 g), N-methylolacrylamide (hereinafter referred to as "N-MAM") (2.4 g), 3-chloro-2-hydroxypropyl methacrylate (hereinafter referred to as "CHPMA") (0.6 g), polyoxyethylene(3)isotridecyl ether (HLB value of 8) (nonionic surfactant, EAD-8 manufactured by NOF Corp.) (3.2 g), polyoxyethylene(50)oleyl ether (HLB value of 18) (BO-50 manufactured by Nikko Chemicals Co., Ltd.) (1.8 g), polyoxyethylene(20)lauryl ether (HLB value of 16) (K-220 manufactured by NOF Corp.) (7.5 g), tripropylene glycol (hereinafter referred to as "TPG") (33.0 g), ion-exchanged water (205 g), and lauryl mercaptan (hereinafter referred to as "L-SH") (2.9 g) were charged and heated at 60° C. The mixture was previously dispersed by a homomixer and emulsified for 10 minutes by an ultrasonic emulsifier.

This emulsion was transferred to a 500 ml autoclave (equipped with a stirrer, a thermometer and nitrogen introducing tube). After replaced with nitrogen, vinyl chloride (hereinafter referred to as "VCl") (28.0 g) was charged. A polymerization initiator, azobisamidinopropane dihydrochloride (0.9 g) was added, and the emulsion was heated to 60° C., to initiate the polymerization.

After stirred at 60° C. for 4 hours, unreacted vinyl chloride was discharged. Disappearance of monomers other than vinyl chloride was confirmed by GC. An aqueous dispersion having a solid content of 31% was obtained. The aqueous dispersion was diluted with ion-exchanged water to give a water and oil repellent composition having a solid content of 30%.

Figure 2:
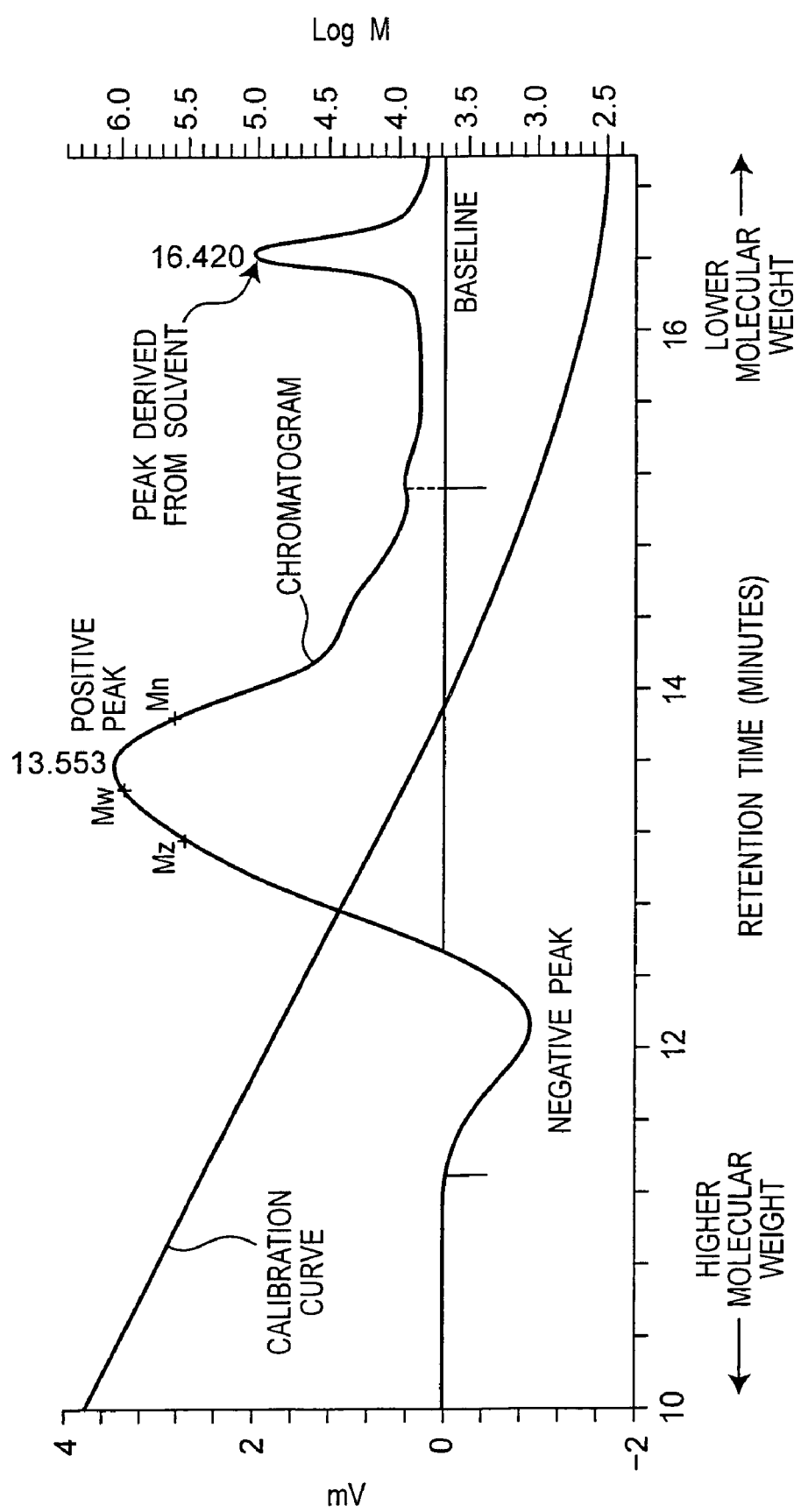
FIG. 2 is a GPC chart of a polymer obtained in Comparative Example 1.

Properties of the obtained composition were evaluated. The results are shown in Table 2. The reaction ratio of vinylidene chloride monomer was 36%. A GPC chart is shown in FIG. 2.

GPC Measurement Results

Usually, in a GPC chart having a detector of RI, a positive or negative peak appears depending on whether the refractive index of the polymer is higher or lower than the refractive index of THF which is a solvent. When the GPC chart has both a negative peak and a positive peak, it is suggested that polymers having different refractive indexes are mixed, that is, the composition distribution is large.

It is suggested that, in Example 1 (FIG. 1), there is no negative peak so that the composition distribution is small, but, in Comparative Example 1 (FIG. 2), there is a negative peak so that the composition distribution is large.

In Comparative Example 1 (FIG. 2), there is a negative peak (a component having low refractive index) at a higher molecular weight side, and there is a positive peak (a component having high refractive index) at lower molecular weight side. Therefore, it is suggested that a high-molecular weight copolymer (supposed to have a high melt viscosity and poor film formability) having a high content of 9FCA (a short-chain Rf group-containing alpha-substituted acrylate) and a low-molecular weight copolymer (not expected to have water- and oil-repellency) having a low content of 9FCA would be produced.

Examples 2 to 12 and Comparative Examples 2 to 4

Water and oil repellent compositions having a solid content of 30% were produced in the same manner as in Example 1 except that the types and amounts of the monomer, the emulsifier, the chain transfer agent and the auxiliary solvent are changed as in Table 2. Properties of the resultant compositions were evaluated. The results are shown in Table 2.

Comparative Example 5

9FCA (75.5 g), StMA (36.6 g), N-MAM (3.0 g), CHPMA (1.2 g), polyoxyethylene(3)isotridecyl ether (HLB value of 8) (nonionic surfactant, EAD-8 manufactured by NOF Corp.) (3.2 g), polyoxyethylene(50)oleyl ether (HLB value of 18) (BO-50 manufactured by Nikko Chemicals Co., Ltd.) (1.8 g), polyoxyethylene(20)lauryl ether (HLB value of 16) (K-220 manufactured by NOF Corp.) (7.5 g), tripropylene glycol (33.0 g), ion-exchanged water (235 g), and lauryl mercaptan (2.9 g) were charged and heated at 60° C. The mixture was previously dispersed by a homomixer and emulsified for 10 minutes by an ultrasonic emulsifier.

This emulsion was transferred to a 500 ml flask (equipped with a stirrer, a thermometer and nitrogen introducing tube). After replaced with nitrogen, a polymerization initiator, azobisamidinopropane dihydrochloride (0.6 g) was added at the temperature of 60° C. to initiate the polymerization. After stirred at 60° C. for 3 hours, the disappearance of monomers was confirmed by GC. An aqueous dispersion having a solid content of 34% was obtained. The aqueous dispersion was diluted with ion-exchanged water to give a water and oil repellent composition having a solid content of 30%. The composition of the polymer was almost the same as the composition of charged monomer.

Properties of the obtained composition were evaluated. The results are shown in Table 2.

The results of Comparative Example 1 to 3 show that the use of vinylidene chloride gives better copolymerizability and performances (such as IPA/water repellency and hydrostatic pressure resistance) than the use of vinyl chloride as the comonomer.

The results of Comparative Example 4 show that alpha-chloroacrylate wherein the alpha-position is chlorine gives better performances than alpha-unsubstituted acrylate as the fluorine-containing monomer.

The results of Comparative Example 5 show that the use of vinylidene chloride as the comonomer gives better performances.

TABLE 2

| | | Example | | | | | | | | |
|---|---|---|---|---|---|---|---|---|---|---|
| | | 1 | 2 | 3 | 4 | 5 | 6 | 7 | 8 | 9 |
| F-monomer | 9FCA | 75.5 | 75.5 | 75.5 | 75.5 | 75.5 | 75.5 | 75.5 | 75.5 | 75.5 |
| | 9FA | | | | | | | | | |
| Comonomer | VdCl2 | 28.0 | 28.0 | 28.0 | 28.0 | 28.0 | 28.0 | 9.0 | 18.5 | 32.7 |
| | VCl | — | — | — | — | — | — | — | — | — |
| | StMA | 9.5 | | | | | 4.8 | 28.5 | 19.0 | 4.8 |
| | StA | | 9.5 | | | | | | | |
| | VMA | | | 9.5 | | | | | | |
| | VA | | | | 9.5 | | | | | |
| | 2EHMA | | | | | 9.5 | | | | |
| | 2EHA | | | | | | 4.7 | | | |

TABLE 2-continued

|  |  | | | | | | | | | |
|---|---|---|---|---|---|---|---|---|---|---|
|  | N-MAM | 2.4 | 2.4 | 2.4 | 2.4 | 2.4 | 2.4 | 2.4 | 2.4 | 2.4 |
|  | CHPMA | 0.6 | 0.6 | 0.6 | 0.6 | 0.6 | 0.6 | 0.6 | 0.6 | 0.6 |
| Chain transfer agent | L-SH | 2.9 | 2.9 | 2.9 | 2.9 | 2.9 | 2.9 | 2.9 | 2.9 | 2.9 |
| Emulsifier | EAD-8 | 3.2 | 3.2 | 3.2 | 3.2 | 3.2 | 3.2 | 3.2 | 3.2 | 3.2 |
|  | BO-50 | 1.8 | 1.8 | 1.8 | 1.8 | 1.8 | 1.8 | 1.8 | 1.8 | 1.8 |
|  | K-220 | 7.5 | 7.5 | 7.5 | 7.5 | 7.5 | 7.5 | 7.5 | 7.5 | 7.5 |
|  | PP-40R | — | — | — | — | — | — | — | — | — |
| Auxiliary solvent | TPG | 33.0 | 33.0 | — | — | — | 33.0 | 33.0 | 33.0 | 33.0 |
|  | DPM | — | — | 33.0 | 33.0 | 33.0 | — | — | — | — |
| F % in polymer |  | 31.8 | 31.6 | 31.9 | 31.3 | 31.1 | 32.1 | 31.0 | 32.2 | 32.6 |
| Cl % in polymer |  | 20.7 | 21.4 | 20.5 | 19.9 | 19.6 | 19.6 | 9.9 | 15.3 | 23.1 |
| VdCl2 or VCl reaction ratio |  | 79% | 83% | 78% | 75% | 73% | 72% | 52% | 73% | 78% |
| GPC (RI) measured molecular weight | Presence of negative peak | No | No | No | No | No | No | No | No | No |
|  | Negative Peak | — | — | — | — | — | — | — | — | — |
|  | Positive peak | 7200 | 7200 | 8500 | 8500 | 8000 | 6900 | 6900 | 6500 | 8100 |
| IPA/water repellency |  | 7− | 6 | 7 | 7 | 6− | 6 | 6− | 7− | 7− |
| Hydrostatic pressure resistance (mm) |  | 493 | 490 | 503 | 497 | 438 | 465 | 434 | 456 | 468 |

|  |  | Example | | | Comparative Example | | | | |
|---|---|---|---|---|---|---|---|---|---|
|  |  | 10 | 11 | 12 | 1 | 2 | 3 | 4 | 5 |
| F-monomer | 9FCA | 75.5 | 75.5 | 75.5 | 75.5 | 75.5 | 75.5 | — | 75.5 |
|  | 9FA |  |  |  |  |  |  | 75.5 |  |
| Comonomer | VdCl2 | 37.5 | 28.0 | 28.0 | — | — | — | 28.0 | — |
|  | VCl | — | — | — | 28.0 | 28.0 | 28.0 | — | — |
|  | StMA |  | 9.5 | 9.5 | 9.5 |  | 4.8 | 9.5 | 36.6 |
|  | StA |  |  |  |  | 9.5 |  |  |  |
|  | VMA |  |  |  |  |  |  |  |  |
|  | VA |  |  |  |  |  |  |  |  |
|  | 2EHMA |  |  |  |  |  |  |  |  |
|  | 2EHA |  |  |  |  |  | 4.7 |  |  |
|  | N-MAM | 2.4 | 2.4 | 2.4 | 2.4 | 2.4 | 2.4 | 2.4 | 2.4 |
|  | CHPMA | 0.6 | 0.6 | 0.6 | 0.6 | 0.6 | 0.6 | 0.6 | 0.6 |
| Chain transfer agent | L-SH | 2.9 | 2.9 | 2.9 | 2.9 | 2.9 | 2.9 | 2.9 | 2.9 |
| Emulsifier | EAD-8 | 3.2 | — | 8.0 | 3.2 | 3.2 | 3.2 | 3.2 | 3.2 |
|  | BO-50 | 1.8 | 8.4 | 4.5 | 1.8 | 1.8 | 1.8 | 1.8 | 1.8 |
|  | K-220 | 7.5 | — | — | 7.5 | 7.5 | 7.5 | 7.5 | 7.5 |
|  | PP-40R | — | 2.5 | — |  |  |  |  |  |
| Auxiliary solvent | TPG | 33.0 | — | — | 33.0 | 33.0 | 33.0 | 33.0 | 33.0 |
|  | DPM | — | 33.0 | 33.0 |  |  |  |  |  |
| F % in polymer |  | 30.4 | 31.7 | 31.4 | 36.9 | 35.3 | 37.7 | 34.2 | 31.0 |
| Cl % in polymer |  | 24.7 | 19.2 | 20.2 | 12.9 | 12.4 | 13.4 | 15.6 | 6.3 |
| VdCl2 or VCl reaction ratio |  | 80% | 71% | 76% | 37% | 36% | 40% | 87% | — |
| GPC (RI) measured molecular weight | Presence of negative peak | No | No | No | Yes | Yes | Yes | No | No |
|  | Negative Peak | — | — | — | 72200 | 25700 | 26900 | — | — |
|  | Positive peak | 6000 | 7900 | 8300 | 8200 | 2000 | 2100 | 10500 | 5700 |
| IPA/water repellency |  | 6 | 7 | 7 | 4 | 3 | 4 | 4 | 4 |
| Hydrostatic pressure resistance (mm) |  | 442 | 480 | 485 | 432 | 400 | 436 | 375 | 358 |

9FA: CH$_2$=CHCOOCH$_2$CH$_2$C$_4$F$_9$
StA: stearyl acrylate
VMA: behenyl methacrylate
VA: behenyl acrylate
2EHMA: 2-ethylhexyl methacrylate
2EHA: 2-ethylhexyl acrylate
PP-40R: sorbitan monopalmitate (nonionic surfactant, HLB value of 7, manufactured by NOF Corp.)
DPM: dipropylene glycol monomethyl ether

What is claimed is:

1. A water- and oil-repellent agent comprising:
(A) a fluorine-containing copolymer which comprises repeating units derived from:
(a1) a fluoroalkyl group-containing polymerizable monomer of the formula:

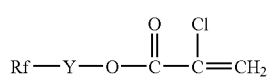
(I)

wherein Y is a divalent organic group selected from the group consisting of an aliphatic group having 1 to 10 carbon atoms, an aromatic or cycloaliphatic group having 6 to 10 carbon atoms, a —SO$_2$N(R$^1$)R$^2$— group (in which R$^1$ is a hydrogen atom or an alkyl group having 1 to 4 carbon atoms, and R$^2$ is an alkylene group having 1 to 10 carbon atoms), a —CON(R$^1$)R$^2$— group (in which R$^1$ is a hydrogen atom or an alkyl group having 1 to 4 carbon atoms, and R$^2$ is an alkylene group having 1 to 10 carbon atoms), and a —CH$_2$CH(OY$^1$)CH$_2$— group (in which Y$^1$ is a hydrogen atom or an acyl group having 1 to 4 carbon atoms); and Rf is a linear or branched fluoroalkyl or fluoroalkenyl group having 1 to 6 carbon atoms;
(a2) vinylidene chloride;
optionally
(a3) (meth)acrylate having a linear or branched alkyl or alkenyl group, or cycloaliphatic alkyl or alkenyl group; and, optionally
(a4) a polymerizable monomer containing a crosslinking group or a hydrophilic group, other than the monomers (a1), (a2) and (a3).

2. The water- and oil-repellent agent according to claim 1, wherein the Rf group in the monomer (a1) is a perfluoroalkyl group having 1 to 4 carbon atoms.

3. The water- and oil-repellent agent according to claim 1, wherein the monomer (a3) is an alkyl or alkenyl(meth)acrylate, and the alkyl or alkenyl group has 16 or more carbon atoms.

4. A water- and oil-repellent composition comprising:
(A) a fluorine-containing copolymer which comprises repeating units derived from:
(a1) a fluoroalkyl group-containing polymerizable monomer of the formula:

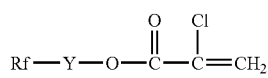

(I)

wherein Y is a divalent organic group
selected from the group consisting of an aliphatic group having 1 to 10 carbon atoms, an aromatic or cycloaliphatic group having 6 to 10 carbon atoms, a $-SO_2N(R^1)R^2-$ group (in which $R^1$ is a hydrogen atom or an alkyl group having 1 to 4 carbon atoms, and $R^2$ is an alkylene group having 1 to 10 carbon atoms), a $-CON(R^1)R^2-$ group (in which $R^1$ is a hydrogen atom or an alkyl group having 1 to 4 carbon atoms, and $R^2$ is an alkylene group having 1 to 10 carbon atoms), and a $-CH_2CH(OY^1)CH_2-$ group (in which $Y^1$ is a hydrogen atom or an acyl group having 1 to 4 carbon atoms); and
Rf is a linear or branched fluoroalkyl or fluoroalkenyl group having 1 to 6 carbon atoms;
(a2) vinylidene chloride;
optionally
(a3) (meth)acrylate having a linear or branched alkyl or alkenyl group, or cycloaliphatic alkyl or alkenyl group; and, optionally
(a4) a polymerizable monomer containing a crosslinking group or a hydrophilic group, other than the monomers (a1), (a2) and (a3);
(B) a surfactant comprising
(b1) a nonionic surfactant, and
optionally,
(b2) an ionic (cationic or anionic or amphoteric) surfactant; and
(C) an aqueous medium which is a medium consisting of water, or a medium comprising water and a water-soluble organic solvent.

5. The water- and oil-repellent composition according to claim 4, wherein the surfactant (b1) is a nonionic surfactant comprising at least one surfactant having an HLB value of at most 10 and at least one surfactant having an HLB value of at least 15.

6. A method of treating a non-woven fabric made of polyolefin resin, which comprises using the water- and oil-repellent agent according to claim 1 or the composition according to claim 4.

7. A method of treating a non-woven fabric made of polyolefin resin, which comprises applying the fabric with the water- and oil-repellent composition according to claim 4 and then drying the fabric at the temperature of at most 140° C.

8. The method according to claim 6, wherein at least one selected from an antistatic agent and a wetting agent is used in addition to the water- and oil-repellent composition.

9. A treated article for medical and sanitary applications, which is water- and oil-repellent treated with the method according to claim 6.

10. A fluorine-containing copolymer comprising repeating units derived from:
(a1) a fluoroalkyl group-containing polymerizable monomer of the formula:

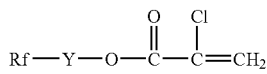

(I)

wherein Y is a divalent organic group
selected from the group consisting of an aliphatic group having 1 to 10 carbon atoms, an aromatic or cycloaliphatic group having 6 to 10 carbon atoms, a $-SO_2N(R^1)R^2-$ group (in which $R^1$ is a hydrogen atom or an alkyl group having 1 to 4 carbon atoms, and $R^2$ is an alkylene group having 1 to 10 carbon atoms), a $-CON(R^1)R^2-$ group (in which $R^1$ is a hydrogen atom or an alkyl group having 1 to 4 carbon atoms, and $R^2$ is an alkylene group having 1 to 10 carbon atoms), and a $-CH_2CH(OY^1)CH_2-$ group (in which $Y^1$ is a hydrogen atom or an acyl group having 1 to 4 carbon atoms); and
Rf is a linear or branched fluoroalkyl or fluoroalkenyl group having 1 to 6 carbon atoms;
(a2) vinylidene chloride;
(a3) (meth)acrylate having an alkyl or alkenyl group, and the alkyl or alkyenyl group has 16 or more carbon atoms; and
(a4) a polymerizable monomer containing a crosslinking group or a hydrophilic group, other than the monomers (a1), (a2) and (a3);
wherein the component (a1) is from 40 to 90% by weight, the component (a2) is from 5 to 50% by weight, the component (a3) is from 1 to 40% by weight, and the component (a4) is from 0.1 to 15% by weight.

* * * * *